United States Patent [19]

Horikawa et al.

[11] Patent Number: 4,546,250

[45] Date of Patent: Oct. 8, 1985

[54] DETECTOR IN AN IMAGE READ-OUT SYSTEM

[75] Inventors: Kazuo Horikawa; Yutaka Taniguchi, both of Minami-ashigara, Japan

[73] Assignee: Fuji Photo Film Co., Ltd., Japan

[21] Appl. No.: 419,199

[22] Filed: Sep. 17, 1982

[30] Foreign Application Priority Data

Sep. 18, 1981 [JP] Japan .................................. 56-147070

[51] Int. Cl.⁴ ............................................... G02B 5/14
[52] U.S. Cl. ...................................... 250/227; 250/572
[58] Field of Search .............. 250/227, 572, 571, 327.2, 250/205; 356/431, 444; 350/96.24; 235/473

[56] References Cited

U.S. PATENT DOCUMENTS 3,096,431  7/1963  Schmidlin ........................... 235/473
4,289,406  9/1981  Maddox ............................... 250/571
4,368,384  1/1983  Kato et al. ........................... 250/205
4,410,799 10/1983  Okamoto ........................... 250/237.2

Primary Examiner—David C. Nelms
Assistant Examiner—J. Gatto
Attorney, Agent, or Firm—Murray, Whisenhunt and Ferguson

[57] ABSTRACT

A photo-sensor, such as a photo-diode, is applied to the converging area of a flat type light transmission unit in an image read-out system, thereby intercepting a part of the scan light which falls on and travels through the light transmission unit after being reflected from an image-bearing sheet. The output signal from the photo-sensor can be advantageously used to detect arrival of the sheet edge at the scanning station, any scratches on the sheet and other operating conditions as required.

6 Claims, 2 Drawing Figures

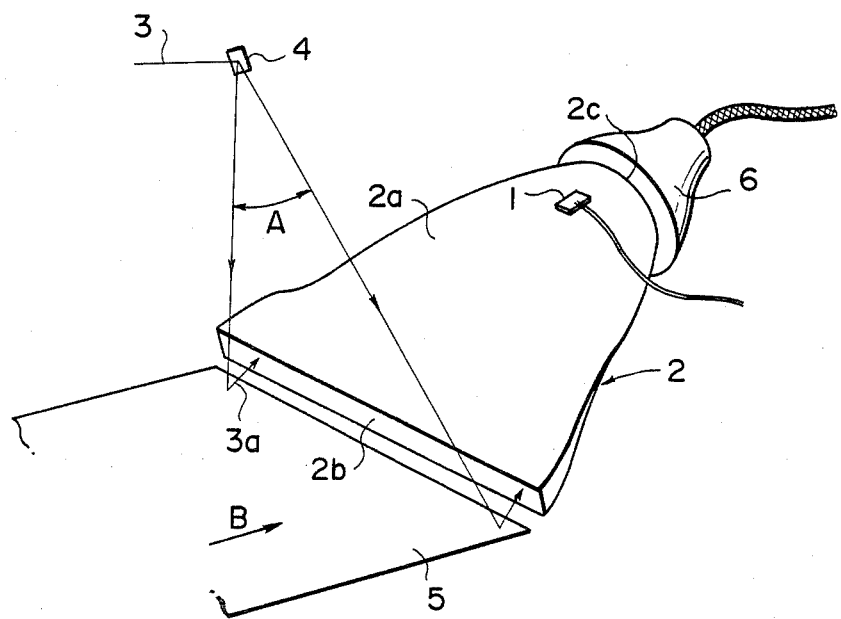
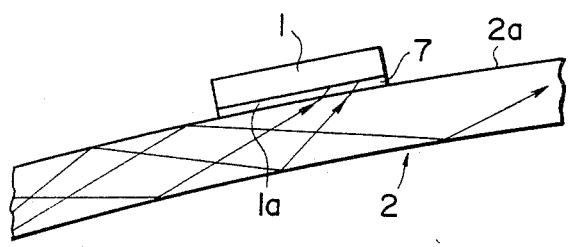

DETECTOR IN AN IMAGE READ-OUT SYSTEM

BACKGROUND OF THE INVENTION

Field of the Invention

This invention relates to a detector for use in an image scan-and-read-out system, and particularly to means for detecting pieces of information other than images when used in an image read-out system using a flat type light-transmission optical unit for reading an image which is swept with a scan beam of light.

There has been proposed a flat type light-transmission optical member for use in collecting the light reflected from or passing through an image-bearing sheet being swept with a scan laser beam thereby to direct the so-collected light to a photomultiplier or some other kind of photo-electric converter (See Light-transmission sheet material disclosed in Japanese Unexamined Patent Publication No. 55(1980)-88005). The flat type light-transmission optical member is herein below referred to as a "light-transmission member". In case such light transmission member is used in collecting the light reflected from or passing through a photographic film, a photogravure or some other kind of sheet material bearing pieces of information in the form of images or pictures being swept with a scan beam of light, it is necessary to detect the presence (or absence) of the sheet, any scratches on the sheet, the intensity of the scan light and other required information. Specifically, a start signal indicating the start of image scanning is generated in response to the arrival of the image bearing sheet at the scanning station, the light from or passing through a selected portion of the sheet is detected for use as a reference with respect to which a determination is made as to whether any modification in the amount of the light reflected or passing through the sheet other than the portion selected for reference is caused by an image or by a scratch on the sheet, and the intensity of the scan beam is detected to control the amplification factor of the photo-electric converter.

The output signal from the photo-electric converter can be used for certain detections as required. Indeed, the output signal from the photo-electric converter can be used to detect the arrival of the sheet at the scanning station and to determine the intensity of the scan beam. But, this is impossible or useless in detecting a scratch on the sheet because of the incapability of distinguishing the reflected or passing light from the scan light. There is known an image read-out system in which a stimulable phosphor sheet storing an X-ray or radiation image is exposed to an exciting light to cause a luminous image to appear in the sheet, and then the luminescence is collected with the aid of a light-transmission read-out (See U.S. Pat. Ser. Nos. 105,240 and 168,805). In such an image read-out system the luminescence from the luminous image is at a relatively low intensity and an optical filter is put ahead of the photomultiplier to select the luminescence as required eliminating the component of exciting light which, otherwise would eventually appear as a noise component. In this case the output signal from the photomultiplier contains no exciting light component, and therefore the intensity of the exciting light cannot be detected from the output signal from the photomultiplier. When the output signal happens to decrease, a determination cannot be made as to whether the instantaneous decrease is due to a scratch or a dark portion of the image not a defect on the sheet. In order to make a detection as required, it is necessary to provide extra light-collecting means such as an optical fiber, glass rod or acrylic rod at a place where it can receive the light reflected from the sheet, and to provide an associated photo-sensor to which the light-collecting means directs the so-collected light. This requires the provision of extra components exclusively for the purpose, and hence a corresponding increase is caused in the manufacturing cost. Also, in this kind of light collection the "shading effect" must be reduced to the minimum possible. Specifically, the output signal from the light collecting means is required to show a relatively small variation over the scan range across the sheet, and in order to meet this requirement these must be provided an increased number of optical elements, for instance, photo-sensors allotted for the purpose, and accordingly an increase in cost results.

SUMMARY OF THE INVENTION

The object of this invention is to provide a detector which permits the use of a part of the light-transmission member for the purpose of making detections as required thus obviating the necessity of providing extra light-collecting means for the exclusive purpose for making such detections.

To attain this object according to this invention a photo-sensor is provided or a selected part of the converging area of a light transmission member so that a portion of the reflected light is caught by the photo-sensor while traveling from the transverse inlet to the convergent outlet of the light transmission member.

With this arrangement a portion of the reflected light falling in and traveling through the light-transmission member is picked up, the light thus picked up is free of "shading effect", and is most appropriate for the purpose of making detections as mentioned earlier. Advantageously, no extra optical units other than a photo-sensor is required, causing no appreciable increase of manufacturing cost.

The photo-sensor can be positioned anywhere within the converging area of the light transmission member. With a view to minimizing the lose of incident light, however, the photo-sensor is preferably positioned in the vicinity of the convergent end of the light transmission member to which a photo-electric converter is connected.

In an image read-out system in which a stimulable phosphor sheet bearing a radiation image is exposed to an exciting light to cause a luminous image to appear in the sheet, there may be provided a filter behind the light transmission member, thereby preventing the exciting light from passing to an associated photo-electric converter, and allowing the luminescence to pass thereto. In this case the photo-sensor lying on the converging area of the light-transmission member selectively detects the component of the exciting light which would be influenced by a scratch on the sheet (in front of the photo-sensor there being provided a filter to pass selectively the the component of exciting light). Alternatively, the photo-sensor detects the composite light constituted of an exciting light component and a luminescence component, and another photo-sensor at the outlet of the light transmission member detects only the luminescence component with the aid of a filter having the required optical selectivity. Then, the output signals from these photo-sensors are compared with each other, thereby making a determination as to whether any given decrease of the luminescence component is caused by a scratch on the sheet or by a dark (but not defecture) part of the luminous image. Thus, any scratch on the sheet can be detected.

BRIEF DESCRIPTION OF THE DRAWINGS

FIG. 1 shows a perspective view of a light-transmission member having a detector attached thereon according to this invention, and FIG. 2 is an enlarged view showing a part of the light-transmission member.

DESCRIPTION OF THE PREFERRED EMBODIMENTS

Referring to FIG. 1, there is shown an embodiment according to this invention in which a photo-diode 1 is attached onto a light-transmission member 2 with the light receiving side of the photo-diode laid on the converging surface 2a of the light-transmission member 2. A laser beam 3 is made to oscillate back and forth across a sheet 5 via an oscillating deflection mirror 4 as indicated by arrow "A", and the reflected light 3a passes into the transverse inlet 2b of the light-transmission member 2. The incident light reflects repeatedly from the opposite surfaces of the light-transmission member, and travels to the convergent outlet 2c of the light-transmission member, which outlet is connected to a photo-multiplier or other type photo-electric converter 6. As shown in FIG. 2, the light-receiving side 1a of the photo-diode 1 is attached onto the surface 2a of the light-transmission member 2 in the vicinity of the convergent outlet there of by a light-transparent adhesive 7. A part of the incident light falls on the light-transmission adhesive 7 and the light-receiving side 1a of the photo-diode 1, and the remaining part of the incident light travels to the photo-electric converter 6.

Thus, the photo-diode 1 attached onto the surface 2a of the light-transmission member 2 receives light in proportion to the amount of light entering the transverse inlet 2b of the light-transmission member 2, thus permitting "shading" free photo-detection, as is most appropriate for detecting the arrival of the leading edge of the sheet at the scanning station; detecting the intensity of the scan laser beam, and detecting any scratches on the sheet.

In the embodiment described above the photo-diode is attached onto the upper surface of the light-transmission member. This is not limitative, and the photo-diode can alternatively be buried in the light-transmission member. A part of the information-bearing light falls on a photo-sensor, such as a photo-diode, and is removed from the whole incident light received by the light-transmission member, allowing the remaining amount of incident light to travel to a photo-electric converter, such as a photo-multiplier. The amount of light thus intercepted, however, small compared with the total amount of the incident light so that there is no appreciable effect on read-out.

I claim:

1. A detector comprising a light guiding sheet having a linear light detecting face disposed at one end extending along a scanning line of an image-bearing sheet and an annular light output face disposed at the other end, and a photo-electric convertor connected to said annular light output face, characterized in that said light guiding sheet is provided with a photo-sensor for receiving light incident from said linear light detecting face which propagates through said light guiding sheet.

2. A detector according to claim 1, wherein said photo-sensor is attached onto the surface of said light guiding sheet via a light-transparent adhesive.

3. A detector according to claim 1 or 2 wherein said sheet is a stimulable phosphor sheet storing a radiation image thereon.

4. A detector for use in an image scan-and-read-out system wherein a light beam is caused to oscillate back and forth in a scanning line across a sheet having information to be scanned and read out, said detector comprising a light guiding sheet having a first end and a second end, said light guiding sheet converging from said first end toward said second end, said first end comprising a transverse light inlet adapted to lie parallel to said scanning line and to receive light from said sheet having information to be scanned and read out, said second end comprising a convergent light outlet adapted to connect to an associated photo-electric converter and to pass light propagating through said light guiding sheet from said transverse inlet to said convergent outlet to said photoelectric converter; and a photo-sensor for intercepting a portion of said light propagating through said light guiding sheet.

5. A detector according to claim 4, wherein said photo-sensor is attached onto the surface of said light guiding sheet via a light-transparent adhesive.

6. A detector according to claim 4 or 5, wherein said sheet having information to be scanned and read out is a stimulable phosphor sheet storing a radiation image thereon.

* * * * *